United States Patent [19]

Scher et al.

[11] 4,327,141
[45] Apr. 27, 1982

[54] ABRASION-RESISTANT LAMINATE

[75] Inventors: Herbert I. Scher; Israel S. Ungar, both of Randallstown, Md.

[73] Assignee: Nevamar Corporation, Odenton, Md.

[21] Appl. No.: 136,581

[22] Filed: Apr. 1, 1980

Related U.S. Application Data

[60] Division of Ser. No. 966,921, Dec. 6, 1978, Pat. No. 4,263,081, which is a continuation of Ser. No. 959,404, Nov. 9, 1978, abandoned, and a continuation-in-part of Ser. No. 879,848, Feb. 22, 1978, Pat. No. 4,255,480, which is a continuation-in-part of Ser. No. 758,265, Jan. 10, 1977, abandoned.

[51] Int. Cl.³ .............................................. B32B 3/00
[52] U.S. Cl. ................................... 428/148; 428/149; 428/150; 428/172; 428/207; 428/329; 428/331; 428/336
[58] Field of Search ............... 428/172, 156, 167, 168, 428/164, 165, 204, 206, 207, 309, 329, 208, 148, 149, 150, 331, 336; 156/219, 277, 220, 221, 222, 279, 90; 427/186, 197, 262, 267, 284, 288; 162/134, 135, 136, 137, 225, 128; 264/131, 132

[56] References Cited

U.S. PATENT DOCUMENTS

| | | | |
|---|---|---|---|
| 2,060,824 | 11/1936 | Rafton | 162/128 |
| 2,732,325 | 1/1956 | Lendenaelser | 156/220 |
| 2,739,081 | 3/1956 | Wohnsiedler | 428/474 |
| 3,067,077 | 12/1962 | Latella et al. | 156/277 |
| 3,223,579 | 12/1965 | Dorland et al. | 162/225 |
| 3,346,443 | 10/1967 | Elmer | 428/413 |
| 3,373,070 | 3/1968 | Fuerst | 428/452 |
| 3,373,071 | 3/1968 | Fuerst | 428/452 |
| 3,525,664 | 8/1970 | Hale et al. | 156/279 |
| 3,556,915 | 1/1971 | Stanley et al. | 428/339 |
| 3,669,727 | 6/1972 | Raymond | 156/313 |
| 3,798,111 | 3/1974 | Lane et al. | 162/181 C |
| 3,814,647 | 6/1974 | Scher et al. | 156/219 |
| 3,968,291 | 7/1976 | Cherallies | 428/203 |
| 3,975,572 | 8/1976 | Power | 428/452 |
| 4,006,271 | 2/1977 | French et al. | 428/447 |
| 4,022,943 | 5/1977 | Erb et al. | 428/159 |
| 4,029,842 | 6/1977 | Yohida et al. | 428/334 |
| 4,046,952 | 9/1977 | Shoemaker et al. | 156/90 |

FOREIGN PATENT DOCUMENTS 47-30635 of 1972 Japan.

Primary Examiner—Stanley S. Silverman
Attorney, Agent, or Firm—Karl W. Flocks

[57] ABSTRACT

An abrasion-resistant laminate is prepared by providing an ultra thin coating of micro-crystalline cellulose overcoated with an ultra thin layer of mineral particles and micro crystalline cellulose on the surface of conventional printed paper, followed by impregnating the paper with a conventional laminating resin, and then using the print paper so obtained in a laminating process without the necessity of using an overlay sheet.

10 Claims, 7 Drawing Figures

ABRASION-RESISTANT LAMINATE

This is a division of parent application Ser. No. 966,921, filed Dec. 6, 1978; now U.S. Pat. No. 4,263,081, which is, in turn a continuation of Ser. No. 959,404 of Nov. 9, 1978, now abandoned and a continuation-in-part of application Ser. No. 879,848, filed Feb. 22, 1978, now U.S. Pat. No. 4,255,480 itself a continuation-in-part of application Ser. No. 758,265, filed Jan. 10, 1977, now abandoned. The contents of application Ser. No. 879,848 are incorporated herein by reference.

FIELD OF THE INVENTION

The present invention relates to laminates and, more particularly decorative laminates of high abrasion resistance.

BACKGROUND

High pressure decorative laminates are conventionally produced by stacking and curing under heat and pressure a plurality of layers of paper impregnated with various synthetic thermosetting resins. In normal practice the assembly, from the bottom up, consists of a plurality, e.g. three to eight, core sheets made from phenolic resin impregnated kraft paper, above which lies a pattern or print sheet impregnated with melamine resin; on top of the print sheet is provided an overlay sheet which, in the laminate, is almost transparent and provides protection for the pattern sheet.

The core sheets are conventionally made from kraft paper of about 90-125 pound ream weight. Prior to stacking, the kraft paper is impregnated with a water-alcohol solution of phenol-formaldehyde resole, dried and partially cured in a hot air oven, and finally cut into sheets. The print sheet is a high quality, 50-125 ream weight, pigment filled, alpha cellulose paper that has been impregnated with a water-alcohol solution of melamine-formaldehyde resin, dried and partially cured, and finally cut into sheets. The print sheet, prior to impregnation with the resin, usually has been printed with a decorative design, or with a photogravure reproduction of natural materials, such as wood, marble, leather, etc.

The overlay sheet is almost invariably used when the print or pattern sheet has a surface printing in order to protect the printing from abrasive wear. The overlay sheet is a high quality alpha cellulose paper of about 20-30 pounds ream weight that is also impregnated with melamine-formaldehyde resin in a manner similar to that used for the print sheet, except that a greater amount of resin per unit weight of paper is used. The individual sheets are stacked in the manner indicated above and, if six sheets of impregnated core paper are used, after lamination under heat and pressure there results a finished laminate having a thickness of about 50 mils, it being understood that a different number of sheets can be used to provide thicker or thinner laminates.

The stack of sheets as described above is placed between polished steel plates and subjected to about 230-340° F. (e.g. 300° F.) at 800-1600 p.s.i. (e.g. 1000 p.s.i.) for a time sufficient to consolidate the laminate and cure the resins (e.g. about twenty-five minutes). This causes the resin in the paper sheets to flow, cure and consolidate the sheets into a unitary laminated mass referred to in the art as a decorative high-pressure laminate. In actual practice, two laminated stacks are often pressed back to back, separated by a coated release sheet that allows the two laminates to be peeled apart after pressing. Also, a large proportion of the stacks are laminated with an aluminum foil-kraft paper composite sheet inserted between the overlay and the metal plate, with the aluminum facing the overlay, in order to obtain a laminate having a lower gloss and a slightly textured surface which is desirable for some products.

At the completion of the laminating operation, the backs of the laminates are sanded to permit gluing to particle board, plywood or other substrates. The glued, laminate surfaced panel is then fabricated into furniture, kitchen counter tops, table tops, store fixtures and other end-use applications widely accepted for the combination of appearance, durability and economy.

A number of variations of the above-described general process are known, particularly those operations designed to obtain special effects in appearance and texture. Also other curing cycles are possible and, in fact, sometimes other resin systems are used as well.

Besides decorative high-pressure laminates referred to above, there are also a number of low-pressure products which have been developed in recent years, including low-pressure laminates using either saturated polyester resins, or melamine-formaldehyde resin. One of the fastest growing materials competing with high-pressure laminates in recent years is a product referred to as low-pressure melamine board which is normally pressed in a short cycle at 175-225 p.s.i. at 325°-350° F. These low-pressure products have the advantage of being normally less expensive, but they cannot be given the title of "high pressure laminates" because in order to be entitled to that designation, a product must meet a variety of rigid standards promulgated by the National Electric Manufacturers Association, NEMA LD3-1975 which includes standards relating to abrasive wear, stain resistance, heat resistance, impact resistance, dimensional stability, etc. While various other decorative printed, surfacing materials, such as some of the low-pressure laminates, have certain of the desirable characteristics, no products other than high-pressure laminates currently available have all of these properties.

One of these properties in particular which is very important is abrasion resistance. A high-pressure decorative laminate must have sufficient abrasion resistance to permit use in high exposure areas such as dinette surface tops, check-out counters, etc. The standard NEMA test for abrasion resistance is NEMA test LD-3.01. In this test a laminate sample is clamped on a rotating disc, over which ride two weighted rubber wheels, faced with calibrated sand-paper strips. As the laminate surface is rotated under the wheels, the abrasive action of the sand-paper cuts through the surface of the laminate and gradually through the overlay until the printed pattern is exposed and destroyed. The NEMA standard for TYPE I laminate requires that the laminate, after four hundred rotation cycles, has no more than 50% of its pattern destroyed. The 50% end point is estimated by averaging the number of cycles at which the pattern shows initial wear, and the number of cycles at which the pattern is completely destroyed.

If a high-pressure decorative laminate is prepared in a conventional manner, with a normal 35-40% resin content in the print or pattern sheet, but without an overlay sheet, the abrasion resistance will be only about 50-75 cycles. If specially formulated melamine resins are used in the pattern sheet with a resin content of 50-55%, abrasion resistance of up to about 150-200 cycles are on occasion obtainable without an overlay sheet, but in this latter case the laminates have a tendency to develop surface craze and, furthermore, they are quite difficult to prepare due to the difficulty of impregnating the print sheet in a uniform manner; additionally, they do not meet the 400 cycle minimum required by the NEMA standard.

Nevertheless, it is desirable to produce a laminate without an overlay sheet which is capable of attaining the performance characteristics of a laminate using an overlay, and, in particular, one that provides a 400 cycle abrasion resistance. Furthermore, it is desirable to provide a laminate which, in addition to having the 400 cycle abrasion resistance, has an initial wear point at least equal to the initial wear point of a conventional high-pressure laminate having overlay, typically 175-200 cycles. This is desirable because in actual use the laminate appearance becomes unsatisfactory not when 50% of the pattern is destroyed, but when a much lower percentage is destroyed. It is well known from many years of field experience that conventional laminates with overlay, which have 175-200 cycle initial wear point, when used in hard use areas, will have a satisfactory appearance, at least as long as the normal replacement cycle, it being understood that replacement of most laminates in commercial uses is made for style reasons rather than because of pattern wear. Therefore, a laminate without overlay should meet these same criteria, namely it should have both a NEMA abrasion resistance of at least 400 cycles and an initial wear point in the same test of at least 175-200 cycles, even though the latter requirement is not part of the NEMA standard.

It is desirable to be able to provide these characteristics, but without using an overlay, for several reasons:

1. Overlay adds substantial raw material costs to the manufacture of laminates, both the cost of the overlay paper itself, the cost of the resin used to impregnate the overlay paper and the in-process and handling losses of these materials.

2. The overlay, by imposing an intermediate layer of substantial thickness between the print sheet and the eyes of the viewer, detracts significantly from the desired visual clarity of the pattern. The cellulose fibers used to make overlay paper have a refractive index close to that of cured melamine-formaldehyde resin. The fibers are therefore almost invisible in the cured laminate, and permit the printed pattern to be seen with very little attenuation. However, modern printing techniques are making available very accurate reproductions of natural materials, particularly various wood veneer species. As these printed reproductions approach in appearance the natural veneer, even small amounts of haze or blur introduced by the overlay paper are disturbing visually and destroy much of the realism desired by the user.

3. Furthermore, the overlay contributes to the rejection rate of the laminate products produced. The impregnated, dry overlay sheet tends to attract small dirt particles because it develops static electricity charges during drying. This dirt is hard to detect and remove before laminating, and results in spoiled laminate sheets that cannot be reprocessed. In addition, the impregnated dried overlay is brittle and hard to handle without breakage. Broken pieces are accidentally trapped on the surface of the overlay and also result in visually defective sheets.

Additionally, overlay containing laminate, particularly those having a relatively high surface gloss, have a tendency to become dull very quickly when subjected even to only moderate abrasive wear. This is understandably unacceptable where glossy laminates are desired.

The problem of providing improved abrasion resistance has been a long standing problem in the field. Many solutions to the problem have been suggested and, in fact, some of these have reached commercial development. Nevertheless, prior to the embodiments of the parent applications, it has not been possible to provide a laminate, without an overlay sheet, but having a NEMA abrasion resistance of at least 400 cycles and an initial wear point in the same test of at least 175-200 cycles.

It is well known that small, hard mineral particles dispersed in overlay paper, or in resin mixtures to coat the impregnated pattern sheet, can enhance the abrasion resistance of high-pressure laminates (see, for example, the U.S. Pats. to Michl, 3,135,643; Fuerst, 3,373,071 and Fuerst, 3,373,070). Techniques such as these do not eliminate the overlay, but either enhance its abrasion resistance, or provide an alternate form of overlay and associated resin.

For example, in the Barna U.S. Pat. No. 3,123,515, the overlay sheet is impregnated with a finely divided frit, the impregnated sheet containing between 20 and 60% by weight of resin and frit in which the proportion of frit is between about 35 and 60% of the total solids added. The overlay is used in the normal manner by placing it over the print or pattern sheet.

In the Fuerst U.S. Pat., No. 3,373,070, a process is disclosed whereby silica is incorporated into the overlay structure during the manufacture of the overlay paper itself, thereby providing a uniform distribution of the silica throughout the overlay sheet. This patent includes a discussion near the bottom of column 1 of the disadvantages of the Barna type procedure of impregnating the overlay, Fuerst being of the opinion that a silica rich resinous coating on the top of the overlay is undesirable.

The Michl U.S. Pat., No. 3,135,642 in essence shows the casting of, or the in situ manufacture of, an overlay sheet over the print sheet. The coating includes silica, finely divided cellulose flock; carboxy methyl cellulose and melamine resin solids. The weight of the dry coating is said to be 0.022 to 0.033 pounds per square foot of print sheet on the dry basis. This weight is equivalent to 66-99 pounds per ream, corresponding almost exactly to the weight range of conventional impregnated overlay papers, and has a thickness of about 2.5 mils (see Table D of Michl). At best the Michl procedure provides only a minor raw material cost advantage compared with the use of conventional overlay, and does not solve the problem of impaired visual effects due to haze or blur.

The Fuerst U.S. Pat., No. 3,373,071 is very similar to the Michl patent, except that the overlay cast in situ over the print sheet contains micro crystalline cellulose. This coating is said to be applied, on a dry weight basis, of 0.022 to 0.33 pounds per square foot, again giving a thick coating which weighs at least 66 pounds per ream, the same minimum weight as the conventional impregnated overlay paper. Alumina in significant amounts cannot be used in place of silica because the resultant product contains so much alumina that the products cannot be cut without excessive tool wear. Even the silica, far less abrasive than alumina, presents tool wear problems in the Fuerst products when used in significant amounts.

One interesting technique which was briefly tested at commercial scale, but has now been abandoned, is that disclosed in the Lane et al U.S. Pat. No. 3,798,111 in which there is disclosed the use of small mineral particles, preferably alumina, which are incorporated within and near the upper layer of the base paper during its manufacture. Thus, the abrasive-resistant particles are incorporated in the paper during the papermaking process as in Fuerst '070, but, more analogously to Barna, they are incorporated after the base layer of paper has been formed and is still in a wet state supported on the forming wire.

After its manufacture, this paper of the Lane et al patent is subsequently printed, impregnated and then used in the laminating operation as the print sheet without the necessity of using an overlay. In this process, the printing occurs above or on top of the hard mineral particles and, consequently, high-pressure laminates produced using a print sheet made in accordance with the Lane patent, and without an overlay, have unacceptably low initial wear, even though they do have a NEMA abrasion resistance of at least 400 cycles. In tests, it has been shown that laminates made with the print paper of Lane et al, without overlay, had initial wear values of under 100 cycles, some as low as 35 cycles. Furthermore, in a rubbing test to determine initial wear, such laminates began to show pattern destruction after only 3,000 rub cycles, far less than necessary.

Even if the Lane et al paper is used as an overlay, the three problems caused by overlay and mentioned above (pp. 7 and 8) still exist, although abrasion resistance is excellent.

Other prior art patents of some interest with regard to the background of the present invention are the patents to Fuerst, U.S. Pat. Nos. 3,445,327; Gibbons, 3,928,706 which suggests the use of a cast in situ overlay used together with a conventional overlay, and Merriam, 3,661,673. Of somewhat less interest are the Battista patents 3,259,537 and 3,157,518; Ando et al, 3,716,440; Power et al, 3,946,137 and Boenig, 3,318,760.

There are many end uses of laminates in which initial pattern wear rather than NEMA wear value determine the acceptable life of the surface. For example, supermarket check-out counters, food service counters, cafeteria tables, and other commercial surfaces are exposed to abrasive rubbing and sliding of unglazed dinnerware, canned goods, fiberglas trays, etc. If small areas of the pattern begin to disappear after a relatively short period of use, particularly in an irregular pattern, the surface will be unacceptable to the owner and will result in an expensive replacement. If the surface wears gradually and evenly over a long period of time, the wear out time exceeds the normal replacement cycle due to style changes, approximately 3-5 years.

Figure 1:
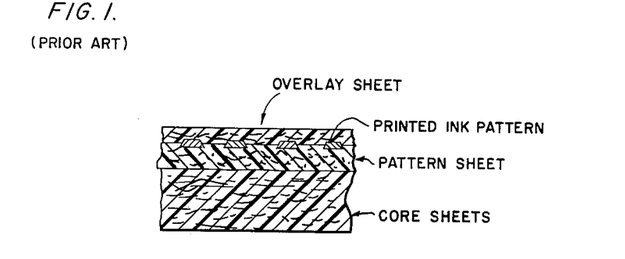
FIGS. 1–3 are schematic sectional views of laminates in accordance with the prior art.
Figure 2:
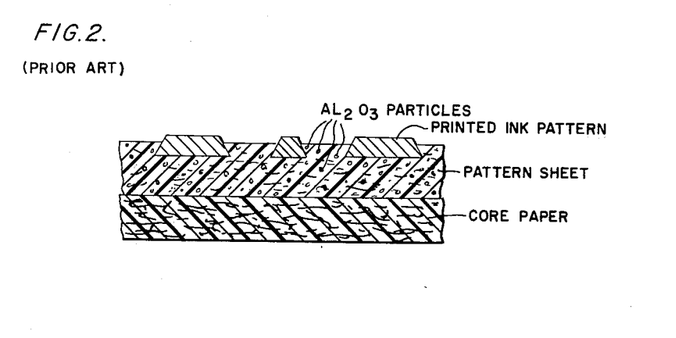

Conventional high pressure laminates (see FIG. 1) with initial wear values of 175-200 are known to be satisfactory in commercial or institutional service, and show perhaps 10-20% pattern loss in 3-5 years on checkout counters. To determine a predicted wear-out time for laminate (FIG. 2) without overlay, made using the print paper of the Lane et al U.S. Pat. No. 3,798,111, such laminates along with conventional laminates and those made in accordance with embodiments of the parent applications were subjected to an abrasive rub test consisting of sliding a simulated fiberglas tray surface back-and-forth over the test laminate, the simulated fiberglas tray surface being bonded to the bottom of a No. 10 can carrying 5 lbs. of weight, and flexibly clamped in a cam driven jig that provided about 5 inches of oscillatory motion. In this test, the laminate according to patent No. 3,798,111 began to show pattern destruction after about 3000 rub cycles. Conventional laminate with overlay and laminate prepared in accordance with embodiments of the parent applications without overlay did not show any pattern destruction after 30,000 cycles.

The "rub test" or "sliding can test" was also used to compare the embodiments of the parent applications with conventional mirror-surfaced laminates having overlay. As previously noted, both start initial pattern destruction at about 30,000 rub cycles. The conventional laminate shows gradual surface dulling beginning almost with the first few hundred rub cycles, and is completely dulled well before initial pattern destruction. The abrasion-resistant embodiments of the parent applications, however, showed negligible surface dulling almost up to the point of pattern destruction. These results suggest not only an important advantage of these laminates compared with conventional laminates including overlay, but also similar advantages compared with laminates produced by the casting of the overlay in situ on the print sheet, e.g. the Fuerst U.S. Pat., No. 3,373,071.

Even after the considerable activity in the field in order to solve the problems indicated above, these problems have not been solved until the embodiments of the parent applications. In the parent applications the technique exemplified utilizes a single ultra-thin layer comprising a mixture of binder and abrasion-resistant particles. While the laminates so produced are far superior to all prior attempts, it has now been found that in a minority of patterns, i.e. heavily inked patterns, and some printed on smooth paper, it is necessary—to achieve good initial wear—to provide the single ultra-thin layer in undesirably heavy thicknesses, i.e. as much as 8-12 lbs/ream or even as high as 16 lbs/ream, whereas most patterns are provided with good initial wear in accordance with the parent applications with ultra-thin coatings of only 4-5 lbs/ream.

While the heavier coatings applied to the heavily inked patterns, still ultra-thin in comparison with the prior art, provide superior initial wear and sliding can values, these laminates (having abrasive-resistant coatings much above 6 lbs/ream where the abrasive particles are alumina) are difficult to handle in the sense that tools used to cut such laminates are quickly worn out by the quantities of alumina present, and chipping at a rapid rate during machine routing operations sometimes occurs.

SUMMARY

It is, accordingly, an object of the present invention to overcome the deficiencies of the prior art and also of the embodiments of the parent applications, such as indicated above.

It is another object of the present invention to provide for an improved decorative laminate.

Another object of the invention is to provide a high-pressure decorative laminate that does not contain an overlay sheet, but which nevertheless meets the requirements of the NEMA abrasion standard, and furthermore provides an initial wear point of at least 175–200 cycles in this same test.

It is yet another object of the present invention to provide such a high-pressure laminate using conventional base papers used for the printing of the pattern or print sheet.

It is still a further object of the present invention to provide a process whereby the printed pattern sheet is impregnated utilizing conventional impregnation and drying equipment commonly used in the laminating field.

It is a further object of the present invention to provide for improved decorative laminates in a manner which does not require substantial raw material costs and which significantly enhance the economics of laminate production by the elimination of the overlay sheet.

Another object of the present invention is to provide a process for making laminates which involves significant cost reduction and results in a product having improved appearance and which has the potential for previously unavailable additional novel graphics development.

Another object of the present invention is to provide for improved low-pressure laminates including the upgrading of low-pressure melamine board.

A further object is to reduce the quantity of abrasion-resistant material necessary to achieve superior abrasion resistance, without causing excessive tool wear in the cutting of the product.

These and other objects of the invention are attained by coating conventional printed or otherwise decorated pattern paper first with an ultra thin coating of suitable binder and then with an ultra thin coating containing small mineral particles immobilized by preferably the same binder, and wherein such print sheet is then impregnated in the normal manner with a suitable thermosetting resin such as melamine resin, and then using the print sheet in the production of decorative laminates without an overlay sheet. The abrasion-resistant particles are, therefore, used in lesser quantities and are more concentrated on the uppermost surfaces of the laminates compared with examples of the parent applications giving equivalent wear resistance.

BRIEF DESCRIPTION OF THE DRAWINGS

The above and other objects and the nature and advantages of the instant invention will be more apparent from the following detailed description of embodiments taken in conjunction with the drawing (not to scale) wherein.

DETAILED DESCRIPTION OF EMBODIMENTS

Figures 4, 5, 6, 7:
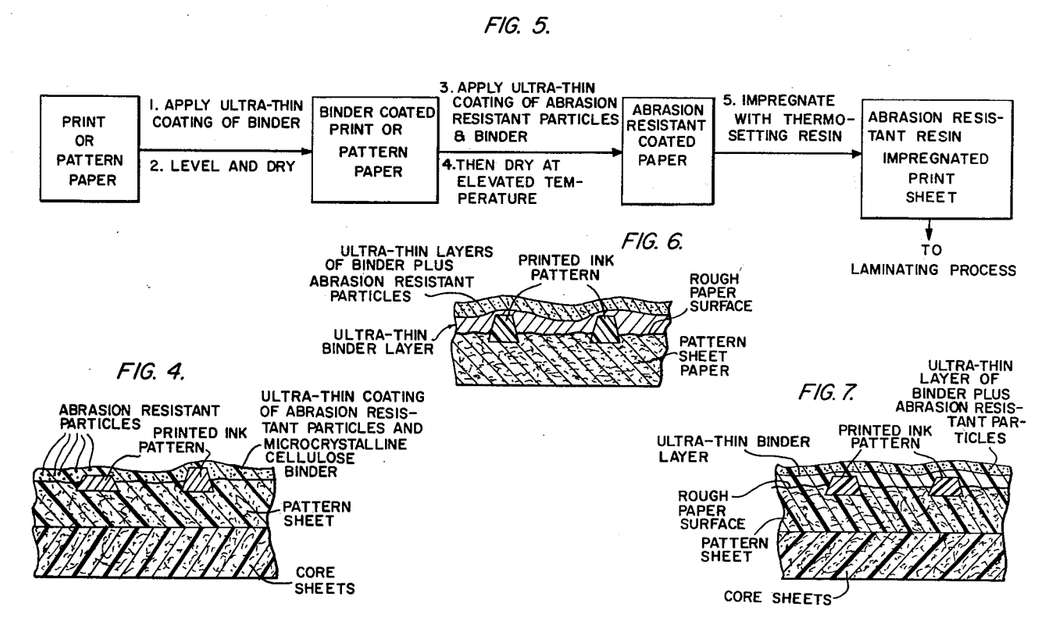
FIG. 4 is a laminate in accordance with embodiments of the parent applications.
FIG. 5 is a flow-diagram showing a method of preparing a print layer in accordance with the present invention.
FIG. 6 is a schematic sectional view, not in scale, showing an embodiment of the print sheet in accordance with the present invention.
FIG. 7 is a schematic sectional view, not in scale, showing a laminate in accordance with the present invention.

Unless paper is highly calandered or otherwise pressed to a very smooth surface, its surface is fairly rough. When paper is printed the ink sinks partly into the upper surface of the paper and partly projects above its upper surface thereby making the upper surface even more rough and irregular. This is the nature of the print paper used in the manufacture of laminates. Some heavily printed patterns in particular have rough surfaces and, accordingly, when an ultra-thin abrasion-resistant coating in accordance with embodiments of the parent applications are applied thereto, the valleys between the peaks where the printing occurs are only partly filled with the result that the abrasion-resistant coating over such peaks is thinner and the surface is still somewhat irregular as schematically illustrated in FIG. 4. The tendency of the coating to level and provide a thinner layer over the peaks is accentuated when the inks are composed of hydrophobic thermoplastics, as is common.

To overcome this problem various solutions are proposed:

(1) the incorporation in the printing inks used on the print paper of silanes to better bond the abrasion-resistant particles of the coating thereto, and/or the incorporation of wetting agents in the inks to better permit wetting of the otherwise hydrophobic ink peaks;

(2) the provision of a second ultra-thin binder layer over the main ultra-thin layer of binder/abrasion-resistant particles to increase the quantity of melamine resin at the surface of the laminate; and (3) the provision of such a second ultra-thin binder layer below the main ultra-thin abrasion-resistant layer.

While all three alternatives give improved results, the third alternative gives by far the most superior results. Therefor, in accordance with the present invention, there is first applied to the print or pattern paper an ultra-thin coating of binder, preferably microcrystalline cellulose of average thickness about 0.05 to 0.3 mils (dry), i.e. applied at a rate of about $\frac{1}{2}$ to 3 pounds per ream. This coating, which tends to level the roughness of the upper surface of the print sheet and also to coat the peaks sufficiently to form a better anchor base for the abrasion-resistant layer than does the ink peaks, is then dried. The ultra-thin abrasion-resistant coating is then applied at a much lower rate without being wasted in the valleys compared with the embodiments of the parent applications, e.g. the abrasion-resistant layer is applied at the rate of only 1–6 pounds per ream to provide a dry upper layer thickness of 0.02–0.2 mils (usually less than 0.15 mils thick) over the first coating which serves as a substrate.

As in the parent applications, the abrasion-resistant composition, containing small mineral particles, when coated without resin over unimpregnated printed pattern paper having a sub-coating thereon, provides surprising and unexpected properties by permitting such paper to be used in the preparation of decorative laminates without an overlay sheet and wherein the resultant laminates are highly abrasion-resistant, using only small amounts of mineral particles and without causing the heavily-inked product to be unduly hard on cutting tools.

In its preferred form, the coating composition is composed of a mixture of small particles of alumina or other abrasion-resistant particles of average 20–50 micron particle size, and a lesser amount of micro-crystalline cellulose particles, both dispersed in a stable, aqueous slurry. The particles of alumina, of small size such that they do not interfere with the visual effects in the final product, serve as the abrasion resistant material and the microcrystalline cellulose particles serve as the preferred temporary binder. It will be understood that the binder must be compatible with the resin system later utilized in the laminating procedure, usually a melamine resin or in the case of certain low-pressure laminates a polyester resin system, and the micro-crystalline cellulose serves this function as well as stabilizing the small particles of alumina on the surface of the print sheet.

The sub-layer is also formed of a temporary binder having the same properties as the binder of the abrasion-resistant layer. Preferably the binder is the same binder, most preferably micro-crystalline cellulose.

With reference to FIG. 5, in the preferred operation a conventional unimpregnated print or pattern paper is coated first with the binder material at a rate of about $\frac{1}{2}$ to 3, preferably about $1\frac{1}{2}$ to $2\frac{1}{2}$, lbs./ream and the coating is leveled and dried. As seen schematically in FIG. 6, the binder layer tends to level and fill in the holes in the surface, e.g. between the ink peaks while providing a coating thereover as well; therefore, while the average thickness of the binder layer may be as great as 0.3 mil, its thickness over the peaks will always be much less, normally less than 0.1 mil. The dried layer is then coated with the mixture of hard mineral particles and binder, preferably alumina and micro-crystalline cellulose particles in a stable aqueous slurry, normally at a rate of about 1–6 lbs. per ream, and the coating is dried at an elevated temperature of at least 140° F. and preferably 180° F., such as in a hot-air oven, to produce a thin over-coating only 0.02 to 0.2 mils thick, usually less than 0.15 mils thick.

The resultant abrasion-resistant coated paper (FIG. 6) is then impregnated with the melamine or polyester resin and dried in a conventional way, at which point it is ready for the laminating procedure. Based on the comparative weights of the print sheet and the micro-crystalline cellulose in the ultra-thin coatings thereon, and the total amount of melamine resin impregnated thereinto, it is calculated that only 2–13 parts of micro-crystalline cellulose are used per 100 parts of resin.

With reference to FIG. 7, it is seen that the abrasion-resistant resin impregnated print sheet, having an ultra-thin abrasive-resistant coating on its upper surface, is assembled for the laminating step in the conventional way, except that no overlay sheet is used. The laminate is then cured under heat and pressure in the conventional manner. A surprising characteristic of the ultra-thin coating is that even though its total thickness (both layers) is so thin, it can provide abrasion resistance in the finished laminate not only meeting 400 cycles NEMA Standard, but also providing an initial wear point in excess of 175–200 cycles.

It is also surprising that the coatings forming the total ultra-thin layer tightly adhere to the surface of the printed paper when the paper is later impregnated with melamine resin, without significant amounts of the mineral particles either being lost in the impregnating solution or migrating away from the surface of the paper. A further surprising characteristic of these coatings is that they do not appear to hinder the penetration of the melamine-formaldehyde resin solution into the interior of the paper, during the impregnation step; such penetration is essential, or the pattern sheet will be irregularly starved such as at its center, and could possibly delaminate after pressing. A further desirable characteristic of the coatings is that they do not significantly scatter or attenuate light, resulting in very clear, crisp appearance of the pattern in the finished laminate. Also, because of the very ultra-thin nature of the mineral particle containing layer, there is no tool wear problem during the subsequent processing of the resultant laminates.

Without being bound to the following theory, it is believed that the improved characteristics of the invention can be accounted for as follows. Microcrystalline cellulose particles contain very large external forces that bind to other polar substances, such as cellulose and alumina. Thus, an aqueous slurry of microcrystalline cellulose and alumina is stable and does not quickly settle out, even though alumina particles in water are not stable. Furthermore, when this slurry is coated onto the paper or the sub-ultra-thin binder layer, the microcrystalline cellulose apparently binds the alumina particles to the surface fibers of the paper or to the binder sub-layer, preventing migration of the alumina particles to below the surface. This may account for the good abrasion resistance developed by such very small quantities of alumina. Thus, all or substantially all of the alumina particles stay at the surface where they do the most good, rather than becoming dispersed below the surface where they would contribute relatively little initial wear resistance.

As indicated above, the preferred slurry composition for the abrasion-resistant ultra-thin upper layer contains a mixture of small particles of alumina and a lesser amount of microcrystalline cellulose particles, both dispersed in water. There must be an amount sufficient of the small mineral particles to provide the resultant product with the desired abrasion resistance as discussed above, and there must be an amount sufficient of the binder to retain the mineral particles in place on the surface of the ultra-thin-sublayer.

In general, it has been found that satisfactory results are attained with about 5 to 10 parts by weight of the microcrystalline cellulose for about 20–120 parts by weight of the alumina; it is possible to work outside this range but there is no advantage doing so and, furthermore, the handling problems become complicated. The quantity of water in the slurry is also directed by practical considerations, since if there is too little water the slurry becomes so thick that it is hard to apply; similarly, if there is too much water the slurry becomes so thin that it is difficult to maintain a consistent thickness during the coating operation due to running of the slurry. Thus, a slurry containing about 2.5 wt % microcrystalline cellulose and about 28 wt % alumina, based on the water, is stable, i.e. the alumina does not settle out; but if more than about 3.5 wt % microcrystalline cellulose and about 28 wt % alumina, based on the water, is used, the slurry becomes very thixotropic and difficult to apply. A preferred slurry contains about 3.2% microcrystalline cellulose and about 9% alumina.

The composition also preferably contains a small amount of wetting agent, preferably a non-ionic wetting agent, a small amount of a subsidiary suspending-binding agent such as carboxy-methyl cellulose, and a small amount of silane. The quantity of wetting agent is not critical, but only a very small amount is desirable and excess quantities provide no advantage. If a subsidiary suspending-binding agent, such as carboxy methyl cellulose is used to help keep the mineral particles in suspension, it may be used in amounts up to about 50% by weight of the amount of the microcrystalline cellulose.

If a silane is used, it acts as a coupling agent* which chemically binds the alumina or other inorganic particles to the melamine matrix after impregnation and cure, and this provides better initial wear since the alumina particles are chemically bound to the melamine in addition to being mechanically bound thereto and therefore stay in place longer under abrasive wear. The silane should be selected from among the group making it compatible with the particular thermosetting laminating resin used; in this regard silanes having an amino group, such as gamma-aminopropyl trimethoxy silane (Silane A-1110) or gamma-aminopropyl triethoxy silane (Silane A-1110) are particularly effective for use with melamine resins. The quantity of silane used need not be great and, in fact, as little as 0.5% based on the weight of the alumina is effective to enhance the abrasion resistance of the final laminate; a maximum quantity of about 2% by weight based on the weight of the alumina or other hard particles is suggested since greater quantities do not lead to any significantly better results and merely increase the cost of the raw materials.

/*Silanes as coupling agents in other arts are known, e.g. in the manufacture of fiberglass tires, grinding wheels and fiberglass reinforced polyester bodies. See the 1976–77 Edition of Modern Plastics Encyclopedia, Page 160, which lists some silanes useful with melamine and polyester systems.

It is an important feature of the present invention that the coating using micro-crystalline cellulose as the binder must be dried at an elevated temperature before the print sheet is impregnated with the melamine resin. Thus, a minimum drying temperature is about 140° F. web temperature and the preferred drying temperatures are from 160°–180° F. web temperature, or even higher.

With regard to the abrasion-resistant mineral particles, alumina is the preferred material. Silica, which has been suggested in certain prior art patents as an abrasion-resistant material, provides considerably inferior results in the present invention compared with alumina, but can be used. Other minerals of sufficient hardness such as zirconium oxide, cerium oxide, diamond dust, etc. can work, but are either too expensive for practical usage or under certain circumstances produce excessive color shift. Glass beads have been tried unsuccessfully. Silicon carbide also was tried, and while providing good abrasion resistance, produced excessive color shift. Mixtures of silica and alumina give good results.

An important feature is the size of the alumina or other hard particles. Beneath 20 micron particle size, abrasion resistance becomes poor, and the preferred minimum average particle size is about 25 microns. Maximum average particle size is limited by surface roughness in the article and interference with visual effects. The preferred maximum average size of the abrasive resistant particles is about 50 microns.

The nature of the binder for the mineral particles is a very important feature in the present invention. Of all the materials tried, microcrystalline cellulose is by far the most satisfactory material. The binder must serve not only to maintain the mineral particles in position on the surface of the sub-layer on the print sheet, but should also act as a suspending agent in the slurry (otherwise, it would be necessary to add an additional suspending agent). The peculiar property of microcrystalline cellulose is that it acts like a typical suspending binding agent and film former, but unlike other agents is not water soluble before or after suspension and forms a highly porous film through which the thermosetting resin can penetrate. In addition, the binder must be compatible with the laminating resin and microcrystalline cellulose is compatible with both melamine resin and polyester resins. Furthermore, it must not scatter or attenuate light in the thicknesses applied in the final laminate, and microcrystalline cellulose is satisfactory in this regard as well.

Other binders which may be used, but which provide inferior results compared with microcrystalline cellulose, are various typical suspending-binding agents including anionic acrylic polymer, carboxy methylcellulose and similar materials such as hydroxypropyl cellulose, methylcellulose, polyvinyl alcohol, polyvinyl pyrrolidone, etc. However, as indicated above, microcrystalline cellulose is by far the preferred binder.

Microcrystalline cellulose is a non-fibrous form of cellulose in which the cell walls of cellulose fibers have been broken into fragments ranging in length from a few microns to a few tenths of a micron. It is not a chemical derivative but a purified alpha cellulose. Microcrystalline cellulose is available under the trademark "AVICEL", the preparation of which is disclosed in the Battista U.S. Pat. No. 3,275,580. AVICEL Type RC 581 is a white, odorless hygroscropic powder. It is water dispersible and contains about 11% sodium carboxymethyl cellulose as a protective colloid. Its particle size is less than 0.1% on a 60 mesh screen.

The ultra-thin sub-layer is much like the ultra-thin abrasion-resistant top layer, except that it preferably contains no abrasion-resistant particles. An aqueous slurry containing about 3–6 wt % microcrystalline cellulose can be satisfactorily coated over the print layer to form a substrate for the ultra-thin abrasion-resistant layer. A small amount of wetting agent may be used.

Features and advantages of the instant invention which are considered to be particularly significant are as follows:

(1) The mixture of mineral particles and micro-crystalline cellulose is deposited from a water slurry, rather than used as fillers in a resin solution. The abrasion-resistant mineral particles and thereby highly concentrated in the resultant layer.

(2) Such slurry is coated on an unimpregnated printed pattern sheet, rather than on an impregnated pattern sheet.

(3) The coating is dried at an elevated temperature of at least 140° F.

(4) The total average coating thickness of both layers is only 0.07 to 0.5 mils, with the upper abrasion-resistant layer being a maximum of 0.2 mils thick, rather than requiring an overlay of 1–2 mils thickness.

(5) After applying the coatings and drying, the pattern sheet is then impregnated with the thermosetting resin, and this conventional impregnation of the pattern sheet is carried out on conventional equipment, rather than special, difficult to control, coating of a thick slurry.

(6) The ultra-thin upper layer provides unexpectedly high abrasion resistance.

The desirable characteristics of the mineral particle binding agent, which characteristics are all met by microcrystalline cellulose, are: It acts as a film former; it acts as a binding agent for the mineral particles; it acts as a suspending agent in the slurry for the mineral particles; it is not washed off during the subsequent thermosetting resin impregnating process; it is compatible with the subsequently applied thermosetting resin, such as melamine resin or polyester resin; it is permeable to the thermosetting impregnating resin (indeed microcrystalline cellulose forms a porous film); it is resistant to the heat generated during the laminating procedure; and it does not scatter or attenuate light in the laminate.

The following examples are offered illustratively:

EXAMPLE I

A—TOP COATING

A typical composition in accordance with the parent applications was applied in an ultra-thin layer in accordance with said applications at a coating weight as shown in Table I to print sheets having a heavily inked pattern. After drying, an Avicel coating was applied at 2 lbs/ream (dry) in an ultra-thin layer over the ultra-thin abrasion-resistant layer, and the top coating was dried; the sheets were then impregnated with melamine resin, the top coating providing for increased melamine coverage and the so-prepared print sheets were used to form laminates without any overlay sheet.

B—UNDER COATING

The process of EXAMPLE I-A was repeated except that the 2 lbs/ream (dry) ultra-thin Avicel coating was applied directly to the upper surface of the print sheets and the ultra-thin abrasion-resistant layer was applied over the dried Avicel layer. By filling the depressions on the print sheet surface first with Avicel, the paper surface was made more level and all of the abrasion-resistant coating was placed over the pattern where it does the most good. No abrasion-resistant coating was wasted in the valleys.

As a comparative example, a laminate was made in accordance with the parent application using only the ultra-thin abrasion-resistant layer. Results may be found in TABLES I and II.

TABLE I

| | | Initial Wear Abrasion Resistance | | |
|---|---|---|---|---|
| HEAVILY INKED PATTERNS (NUMBER) | DRY COAT WEIGHT OF ALUMINA CONTAINING LAYER (lbs/REAM) | SINGLE COAT (CYCLES) | A TOP COATED (CYCLES) | B UNDER COATED (CYCLES) |
| AN-1-1 | 6 | 100 | 300 | — |
| AN-1-1 | 5.6 | — | — | 500+ |
| W-8-104 | 5 | 50 | 400 | — |
| W-8-104 | 5.6 | — | — | 500+ |

It should be noted that the initial wear shown here for single coated laminate is lower than shown in examples of the parent applications. This is characteristic of certain heavily inked patterns, of which these two are examples.

TABLE II

| | | Sliding Can Test | | |
|---|---|---|---|---|
| PATTERN NUMBER | DRY COAT WEIGHT OF ALUMINA CONTAINING LAYER (lbs/REAM) | SINGLE COAT (CYCLES) | A TOP COATED (CYCLES) | B UNDER COATED (CYCLES) |
| AN-1-1 | 6 | 4,627 | 6,057 | — |
| AN-1-1 | 5.6 | — | — | 40,271+ |
| W-8-104 | 5 | 6,500 | 25,433 | — |
| W-8-104 | 4.5 | — | — | 40,825+ |

From this it can be seen that although top coating improves wear, base coating is more effective.

EXAMPLE II

A sample production run of base coated paper was made on an air knife coater. Formulations were as follows:

| UNDER COATING | |
|---|---|
| Water | 300 lbs. |
| Avicel RC 581 | 10 lbs. |
| ABRASION-RESISTANT COATING | |
| Water | 300 lbs. |
| Avicel RC 581 | 11.2 lbs. |
| CMC 7L | 1.4 lbs. |
| Alumina of 30μ average diameter | 30.0 lbs. |
| Silane A-1100 | 0.7 lbs. |

A heavily printed woodgrain pattern, W-8-104, was coated with 1.4 lbs/ream of Avicel under coating and dried. This was followed with 4.2 lbs/ream of abrasion-resistant coating which was then also dried. The so double coated paper was treated with melamine-formaldehyde resin to a resin content of 42–44% and volatile of 5–6%. Laminates without overlay were pressed using this print sheet. Initial wear on laminate made from this paper was 510 cycles. Sliding can test gave over 40,000 strokes. In comparison, noting TABLE I above, single coated laminates having only the ultra-thin abrasion-resistant layer applied to the same heavily coated print sheet, W-8-104, at the rate of 5 lbs/ream, had an initial wear of only 50 cycles.

Sheets of W-8-104 in 0.050" thickness were glued to ¾" particleboard with PVA adhesive. Laminate with a single coat, such as tested in TABLE I at 6 lbs/ream, was compared for "machineability" with the dual coat at 4.2 lbs/ream over 1.4 lbs/ream of base coating. The single coat formulation contained 86.7% alumina; therefore, it contained 6 lbs/ream×0.867=5.2 lbs/ream of alumina. Dual coat contained 69.2% alumina or 4.2 lbs/ream×0.692=2.9 lbs/ream of alumina.

Both panels were machined using carbide flat knives on a shaper. Single coat laminate started slight chipping at about 100 linear feet of machining. Dual coat took about 1000 linear feet to show similar chipping. From this it can be seen that dual coat at a little more than ½ alumina weight had more than 10 times the initial wear and about 1/10 tool wear.

Compared with the prior attempts, the present invention provides vastly improved results such that the present invention can be truly considered to be a revolutionary development in the field of decorative laminates. Insofar as is known, the present invention provides for the first time, except for the embodiments of the parent applications, a laminate without an overlay sheet has been made which is capable of meeting both the NEMA Abrasion Resistance Standard of at least 400 cycles, and an initial wear point in this same test of at least 175-200 cycles.

The closest thing previously available (see FIG. 2) has been the use of print paper made in accordance with the Lane et al U.S. Pat. No. 3,798,111. While laminates made using this paper, without an overlay, have excellent abrasion values according to the NEMA Standard, the initial wear point in these products, however, is still very poor. Tests conducted on such laminates show that many have initial wear values of under 100 cycles, some as low as 35 cycles, whereas conventional laminates made with conventional overlay have an initial wear point of 175-200 cycles. In contrast, laminates made in accordance with the present invention have initial wear points of no less than 175 cycles (usually a minimum of 200 cycles) and up to about 500 cycles.

In addition to providing poorer initial wear values, the laminates made without overlay using the print paper of the Lane et al U.S. Pat. No. 3,798,111 provide other disadvantages as well. In the Lane et al patent, the alumina particles are introduced during the paper making process and this results in a special grade paper for each base paper color required, greatly increasing inventory requirements; in contrast, in the present invention in which the coatings are applied after printing, use is made of all existing stocks of conventional print paper. Furthermore, the present invention is more flexible than the Lane et al process in that it permits tailoring of the abrasion resistance to specific needs, without the cumbersome redevelopment of a paper base on a paper machine.

Figure 3:
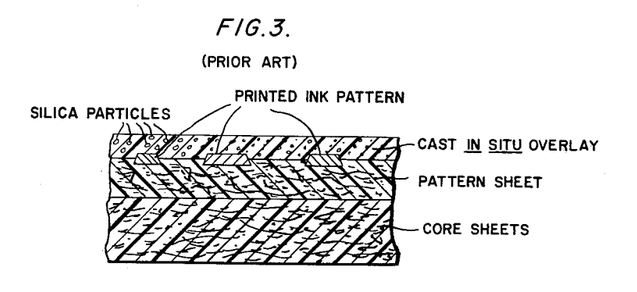

The present invention is also believed to constitute other important improvements over the casting of an overlay sheet (Michl, U.S. Pat. No. 3,135,643 and Fuerst, U.S. Pat. No. 3,373,071; and other patents). Such patents show what is in essence the casting in situ of a resin containing paper layer onto resin impregnated pattern sheet, in which the upper resin paper layer contains abrasion-resistant mineral particles (see FIG. 3). In these techniques, the base paper already contains the melamine resin and the thick coating applied also contains melamine resin. The coating is applied at the rate of, at the very least, 0.022 lbs. per sq. ft. which is a quantity on the order of about 8 times or more as great as that used in the present invention. The thickness of the dry layer runs at least 2 mil and preferably more compared with dry coatings in the present invention running from 0.07 to 0.5 mils, the abrasion layer being preferably a maximum of only 0.15 mils.

The Michl patent essentially discloses how to deposit an overlay layer onto the impregnated pattern sheet, rather than how to eliminate the overlay. The finished laminate (FIG. 3) is essentially the same as that of a conventional laminate, containing cellulose fibers, resin, and differs only by the mineral particles dispersed in this layer. The Fuerst U.S. Pat. No. 3,373,071 states that the process taught by Michl results in laminates that are blotchy when satinized. A significant percentage of laminates are satinized with pumice and rotating brushes to reduce their surface gloss. The Fuerst patent replaces the cellulose fiber of the Michl process with microcrystalline cellulose in order to provide blotch-free surfaces after satinizing. Thus, the basic process of Fuerst is the same as that of Michl, i.e. depositing a resin containing overlay layer onto the wet, impregnated pattern sheet, the thickness of the Fuerst coating being at least four times as thick as the maximum of those found useful in the present invention, and offering no significant savings of raw material compared with conventional, overlay containing laminate. The most significant advantage of the present invention compared to such prior art is, however, the vastly improved abrasion resistance as evidenced by improved initial wear, improved NEMA abrasion resistance and reduced dulling during the sliding can test. Tool wear is also a problem with the Michl and Fuerst laminates, where large quantities of mineral are used.

It will be obvious to those skilled in the art that various changes may be made without departing from the scope of the invention and the invention is not to be considered limited to what is shown in the drawings and described in the specification. For example, it will be understood that certain additional variations in processing will, in certain instances, give somewhat different results. For example, results are generally better when the laminates in accordance with the present invention are formed against a hard surface. Thus, plate produced finishes, such as mirror and satin, provide better initial wear under given coating conditions than do foil (or other soft-backed pressing surfaces) produced finishes. Accordingly, in some instances it is advantageous to calender the dried, coated pattern sheet prior to impregnation with the thermosetting resin.

The foregoing description of the specific embodiments will so fully reveal the general nature of the invention that others can, by applying current knowledge, readily modify and/or adapt for various applications such specific embodiments without departing from the engineering concept and, therefore, such adaptations and modifications should and are intended to be comprehended within the meaning and range of equivalents of the disclosed embodiments. It is to be understood that the phraseology or terminology employed herein is for the purposes of description and not of limitation.

What is claimed is:

1. In an abrasion-resistant decorative laminate meeting NEMA abrasion resistance standards and also capable of withstanding 175-200 cycles of initial wear in the same test, comprising:

a backing layer and laminated thereto a thermoset laminating resin impregnated decorative facing sheet, said decorative facing sheet having a print design thereon and an ultra-thin abrasion-resistant coating having a thickness of up to about 0.2 mils over said print design, said ultra-thin abrasion-resistant coating comprising a mixture of (1) an abrasion-resistant hard mineral of particle size 20-50 microns in high concentration sufficient to provide for abrasion resistance without interfering with visibility and (2) a stabilizing binder material for said mineral which binder is compatible with said thermoset resin impregnated throughout said print sheet, said binder not interfering with visibility, and with said ultra-thin abrasion-resistant coating being at or near the surface of said laminate, the improvement comprising an ultra-thin layer having a thickness of up to about 0.3 mils of binder material impregnated with said thermoset resin and located either directly over the print design surface of said decorative facing sheet beneath said ultra-thin abrasion-resistant coating, or above said abrasion-resistant coating.

2. A decorative laminate in accordance with claim 1, wherein said ultra-thin layer of binder material lies directly over the surface of said print sheet with said ultra-thin abrasion-resistant coating forming the uppermost layer of said laminate.

3. A laminate in accordance with claim 2, wherein said ultra-thin abrasion-resistant coating has a thickness of 0.02–0.15 mils, and said ultra-thin binder layer has an average thickness of 0.05–0.3 mils.

4. A decorative, high-pressure laminate in accordance with claim 2, wherein said backing comprises a plurality of phenolic impregnated paper sheets and said facing sheet comprises a paper sheet impregnated with melamine resin, said abrasion-resistant particles comprising alumina particles, said binder material comprising microcrystalline cellulose, said abrasion-resistant coating comprising about 5–10 parts by weight of said microcrystalline cellulose for about 20–120 parts by weight of said alumina, the thickness of said abrasion-resistant coating being about 0.02–0.2 mils.

5. A laminate in accordance with claim 4, wherein said alumina is bonded to said melamine resin with a silane.

6. A decorative laminate in accordance with claim 2, wherein said thermoset resin is melamine-formaldehyde resin.

7. A laminate in accordance with claim 6, wherein said abrasion-resistant mineral is alumina, and wherein said alumina is chemically bound to said melamine resin with a silane.

8. A laminate in accordance with claim 6, wherein said binder material comprises microcrystalline cellulose.

9. A laminate in accordance with claim 8, wherein said abrasion-resistant mineral particles constitute alumina, silica or mixtures thereof.

10. A laminate in accordance with claim 1 wherein said abrasion-resistant coating comprises a quantity of binder material by weight no greater than the weight of said mineral particles.

* * * * *